United States Patent Office 3,170,936
Patented Feb. 23, 1965

3,170,936
PROCESS FOR THE PREPARATION OF 6,17α-DI-METHYL-4,6-PREGNADIENE-3,20-DIONE
Peter F. Morand and Romano Deghenghi, Montreal, Quebec, Canada, assignors to American Home Products Corporation, New York, N.Y., a corporation of Delaware
No Drawing. Filed Aug. 7, 1963, Ser. No. 300,667
13 Claims. (Cl. 260—397.3)

The present invention relates to a process for the preparation of 6,17α-dimethyl-4,6-pregnadiene - 3,20 - dione (VII), an orally active progestational agent described by R. Deghenghi and R. Gaudry in J. Am. Chem. Soc., vol. 83, p. 4668 (1961). It also relates to new steroid compounds useful as intermediates in the above process and to a process for their preparation.

The particular advantage of the process of the present invention consists in avoiding the initial step in the synthesis of 6,17α-dimethyl-4,6-pregnadiene-3,20-dione (VII) described in the paper cited above, viz. the separation of 3β-hydroxy-17α-methyl-5α,6α - epoxyetianic acid methyl ester from the corresponding 5β,6β-epoxide.

More specifically, the present invention uses the readily available methyl 3β-hydroxy-17α-methyl-$\Delta^5$-etienate (I), described by Plattner in Helv. Chim. Acta, vol. 31, p. 603 (1948), as the starting material. The latter etienic acid ester (I), which may also be called 17α-methyl-17β-carbomethoxyandrost-5-ene-3β-ol, is agitated with hydrogen peroxide in formic acid, preferably at room temperature, thereby securing 3β,5α,6β-trihydroxy-17α-methyl-17β-carbomethoxyandrostane (II). The above tri-hydroxylated compound (II) is treated preferably at room temperature, with a N-halo-imide of a divalent lower aliphatic acid, preferably with N-bromo-succinimide, and the crude oxidation product (IIIa) is acylated, preferably acetylated, in the conventional manner to yield the corresponding 3β-acyloxy-, preferably 3β-acetoxy-5α-hydroxy-17α - methyl-17β-carbomethoxyandrostan-6 - one (IIIb). The compound (IIIb) is dissolved in an inert solvent, preferably dry benzene, and treated with a solution of a methyl magnesium halide, preferably an ether solution of methyl magnesium bromide with addition of dry tetrahydrofuran, at a temperature below 35° C., preferably at room temperature, to obtain 3β,5α,6β-trihydroxy-6α,17α-dimethyl-17β-carbomethoxyandrostane (IV). The latter compound (IV) is again dissolved in an inert solvent, preferably a mixture of dry benzene and dry tetrahydrofuran, and treated with a solution of a methyl magnesium halide, preferably methyl magnesium bromide in ether solution; the resulting mixture is refluxed, preferably after evaporation of substantially all of the solvents boiling below 75–85° C., to yield 3β,5α,6β-trihydroxy-6α,17α-dimethylpregnan-20-one (V). Alternatively, the pregnane derivative (V) may also be obtained by treating either 3β,5α-dihydroxy-17α-methyl-17β-carbomethoxyandrostan-6 - one (IIIa) or its 3β-acetate (IIIb) in solution in an inert solvent, preferably a mixture of dry tetrahydrofuran and dry benzene with a solution of a methyl magnesium halide, preferably an ether solution of methyl magnesium bromide, first at a temperature below 35° C., preferably at room temperature, then adding additional solution of a methyl magnesium halide, preferably an ether solution of methyl magnesium bromide, and refluxing the resulting mixture, preferably after evaporation of a substantial part of the low-boiling solvents.

The results of the Grignard reactions performed on the compounds of Formula IIIa or IIIb have to be regarded as being surprising and unexpected. In fact, when reacting the compounds of Formulae IIIa or IIIb with an excess of methyl magnesium halide at the reflux temperature, the 6-keto group yields the expected carbinol group, while the 17-carbomethoxy group is smoothly transformed to the 17-methyl-ketone group without any concomitant formation of the expected 20-carbinol. When performing the same reaction at lower temperatures, again the 6-keto group reacts normally to give the expected carbinol, but the 17-carbomethoxy group remains surprisingly unaffected to yield the compound of Formula IV. When treating that latter compound with methyl magnesium halide at reflux temperature the 17-methylketone function is formed, but none of the expected 20-carbinol results. These results must be regarded as new and unexpected findings.

The pregnane derivative (V) obtained in the preceding step is then oxidized with a reagent effective to convert a 3β-hydroxy group to a 3-keto group, preferably with hexavalent chromium ion in a molar excess, to yield 5α,6β-dihydroxy-6α,17α-dimethylpregnane-3,20-dione (VI). The latter dione (VI) is treated with a reagent effective to remove the elements of water from positions 4 and 5, and 6 and 7, simultaneously, preferably with concentrated hydrochloric acid in ethanol solution, to yield the desired end product, 6,17α-dimethyl-4,6-pregnadiene-3,20 - dione (VII).

Our invention may be illustrated in the following flow sheet, which illustrates schematically the reactions described above.

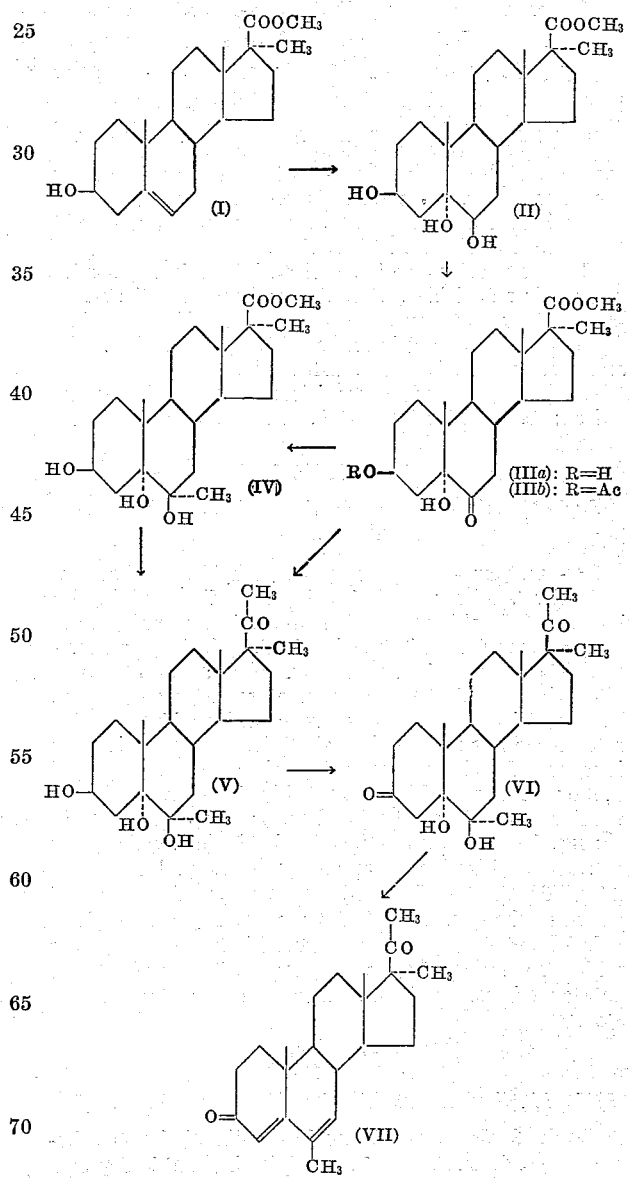

The following illustrative examples will illustrate our invention further.

EXAMPLE 1

$3\beta,5\alpha,6\beta$-trihydroxy-17$\alpha$-methyl-17$\beta$-carbomethoxy-androstane (II)

17$\alpha$ - methyl-17$\beta$-carbomethoxyandrost-5-ene-3$\beta$-ol (I, 5 g.) is dissolved in formic acid (50 ml.) and heated on the steam bath for ten minutes. The solution is cooled to room temperature and a crystalline solid precipitates. This is stirred, 30% hydrogen peroxide (5 ml.) is added, and the reaction mixture is left at room temperature for two hours. The clear solution is poured into water (300 ml.) and the solid which precipitates is filtered. It is dissolved in hot methanol and heated on the steam bath with 10% methanolic potassium hydroxide solution (15.8 ml.) for ten minutes. Then more potassium hydroxide solution (2 ml.) is added, the solution is cooled and on dilution with water a solid (II), M.P. 245–255° C., is obtained. A second crop is obtained from the mother liquors. Several recrystallizations from acetone yield an analytical sample, M.P. 262–265° C., $[\alpha]_D^{24}$ —2.1°.

Analysis confirmed the empiric formula $C_{22}H_{36}O_5$: Required: C, 69.44%; H, 9.54%. Found: C, 69.28%; H, 9.26%.

EXAMPLE 2

$3\beta$-acetoxy-5$\alpha$-hydroxy-17$\alpha$-methyl-17$\beta$-carbomethoxyandrostan-6-one (IIIb)

$3\beta,5\alpha,6\beta$ - trihydroxy - 17$\alpha$-methyl-17$\beta$-carbomethoxyandrostane (II, 5.2 g.) is dissolved in methanol (105 ml.) to which ether (105 ml.) and water (84 ml.) are added. Then N-bromosuccinimide (5.2 g.) is added with stirring and the clear solution is left in the refrigerator for three hours. The ether is removed under reduced pressure at room temperature and a crystalline solid (IIIa) separates, M.P. 268–272° C.

The above substance is dissolved in pyridine (15 ml.) and acetic anhydride (7.5 ml.), and heated on the steam bath for one-half hour. The product (IIIb) crystallizes from aqueous ethanol in leaflets, M.P. 237–239° C. An analytical sample has M.P. 241–243° C.

Analysis confirmed the empiric formula $C_{24}H_{36}O_6$: Required: C, 68.59%; H, 8.62%. Found: C, 69.05%; H, 8.72%.

EXAMPLE 3

$3\beta,6\alpha,6\beta$-trihydroxy-6$\alpha$,17$\alpha$-dimethyl-17$\beta$-carbomethoxyandrostane (IV)

3$\beta$ - acetoxy - 5$\alpha$-hydroxy-17$\alpha$-methyl-17$\beta$-carbomethoxyandrostan-6-one (III, 1,004 g.) is dissolved in dry benzene (25 ml.) and methyl magnesium bromide solution in ether (3M, 10 ml.) is added. The reaction mixture is diluted with dry tetrahydrofuran (25 ml.) and allowed to stand at room temperature for twenty hours. Excess Grignard reagent is quenched by adding a saturated solution of ammonium chloride. The organic layer is separated and the aqueous layer is extracted with ethyl acetate. After washing the combined extracts with ammonium chloride solution and water and working up in the usual way a white solid (IV) is obtained which after one recrystallization from aqueous methanol has M.P. 242–243° C. The infrared spectrum of this compound indicates the presence of a carbomethoxy group (1730 cm.$^{-1}$) and disappearance of the 6-keto group together with the presence of an ester group (1727 cm.$^{-1}$). This substance is used without further purification for the next step.

EXAMPLE 4

$3\beta,5\alpha,6\beta$-trihydroxy-6$\alpha$,17$\alpha$-dimethylpregnan-20-one (V)

Crude $3\beta,5\alpha,6\beta$-trihydroxy-6$\alpha$,17$\alpha$-dimethyl-17$\beta$-carbomethoxyandrostane (IV, 773 mg) is dissolved in dry benzene (25 ml.) and tetrahydrofuran (freshly distilled over lithium aluminum hydride, 25 ml.). To the stirred solution under dry $N_2$ there is added methyl magnesium bromide solution in ether (3M, 10 ml.) over a period of ten minutes. Then the ether and tetrahydrofuran are almost all distilled and the resulting solution is refluxed for three hours (solid precipitates during the reaction). The reaction mixture is cooled and worked up in the same way as in the previous experiment leaving a white solid (V) with an infrared spectrum which indicates the presence of a 20-ketone group (1690 cm.$^{-1}$), a sample of which is recrystallized to M.P. 238–240° C.

Analysis confirmed the empiric formula $C_{23}H_{38}O_4 \cdot H_2O$: Required: C, 69.60%; H, 10.17. Found: C, 69.90%; H, 10.15%.

Alternatively, 25.0 grams of either $3\beta,5\alpha$-dihydroxy-17$\alpha$-methyl-17$\beta$-carbomethoxyandrostan-6-one (IIIa) or 25.0 grams of its 3$\beta$-acetate (IIIb), are dissolved in dry tetrahydrofuran (1,250 ml., freshly distilled over lithium aluminum hydride) and dry benzene (2,000 ml.) is added. Methyl magnesium bromide in ether solution (3M, 750 ml.) is added to the stirred solution and the resulting mixture is stirred at room temperature for 16 hours. An additional quantity of methyl magnesium bromide solution in ether (2M, 375 ml.) is added, and 1,250 ml. of the solvent mixture are distilled off. The resulting mixture is refluxed for 5 hours and worked up as described above, yielding compound (V) as a colorless oil.

EXAMPLE 5

$5\alpha,6\beta$-dihydroxy-6$\alpha$,17$\alpha$-dimethylpregnane-3,20-dione (VI)

Crude $3\beta,5\alpha,6\beta$-trihydroxy-6$\alpha$,17$\alpha$-dimethylpregnan-20-one (V, 650 mg.) is dissolved in acetone (freshly distilled over potassium permanganate, 150 ml.) and cooled in an ice-water bath with stirring. Then excess chromic acid solution (8 N) is added and stirring is continued at room temperature for four minutes. The reaction mixture is poured into water and extracted with ethyl acetate. The combined extracts are washed with dilute sodium bicarbonate solution and water and then dried over magnesium sulphate. Removal of the solvent leaves a white solid (VI). This crude product is used for the next step. Its I.R. spectrum shows a strong band at 1705 cm.$^{-1}$. A sample is recrystallized to M.P. 243–245° C. (dec.), $[\alpha]_D^{24}$ —16.9° (c.=0.83% in ethanolpyridine).

Analysis confirmed the empiric formula $C_{23}H_{36}O_4$: Required: C, 73.36%; H, 9.64%. Found: C, 73.23%; H, 9.65%.

EXAMPLE 6

6,17$\alpha$-dimethyl-4,6-pregnadiene-3,20-dione (VII)

$5\alpha,6\beta$-dihydroxy - 6$\alpha$,17$\alpha$-dimethylpregnane-3,20-dione (VI, 553 mg.) is dissolved in absolute ethanol (60 ml.) and two drops of concentrated hydrochloric acid are added. This solution is heated on a steam bath for forty-five minutes, cooled, diluted with water and extracted with ether. The combined extracts are washed with dilute sodium bicarbonate solution and water and subsequently dried over magnesium sulphate. After the solvent has been removed a syrup remains and the ultra violet spectrum of this substance indicates the presence of a $\Delta^{4,6}$-ketone. Elution of this material over alumina (Woelm, Grade III, 25 g.) with 1:1 hexane-benzene gives a crystalline substance, M.P. 138–141° C. which, after one recrystallization from ether, has an infrared spectrum identical to that of an authentic sample of 6,17$\alpha$-dimethyl-4,6-pregnadiene-3,20-dione (VII).

We claim:

1. The process of preparing 6,17$\alpha$-dimethyl-4,6-pregnadiene-3,20-dione which comprises treating 17$\alpha$-methyl- 17β-carbomethoxyandrost-5-ene-3β-ol with hydrogen peroxide in formic acid, thereby securing 3β,5α,6β-trihydroxy-17α-methyl-17β-carbomethoxyandrostane; treating said last-named compound with the N-halo-imide of a divalent lower aliphatic acid and acetylating the crude reaction product, thereby securing 3β-acetoxy-5α-hydroxy-17α-methyl-17β-carbomethoxyandrostan-6-one; treating said last-named compound, in solution in an inert anhydrous solvent, with methyl magnesium bromide, thereby securing 3β,5α,6β-trihydroxy-6α,17α-dimethyl-17β-carbomethoxyandrostane; treating said last-named compound, in solution in an inert anhydrous solvent, with methyl magnesium bromide, thereby securing 3β,5α,6β-trihydroxy-6α,17α-dimethylpregnan-20-one; treating said last-named compound with an oxidizing agent which includes hexavalent chromium ion in molar excess thereby converting said 3β-hydroxy group to a 3-keto group, thereby securing 5α,6β-dihydroxy-6α,17α-dimethylpregnane-3,20-dione, and treating said last-named compound with concentrated hydrochloric acid in ethanol solution, thereby securing 6,17α-dimethyl-4,6-pregnadiene-3,20-dione.

2. The process of preparing 6,17α-dimethyl-4,6-pregnadiene-3,20-dione which comprises treating 17α-methyl-17β-carbomethoxyandrost-5-ene-3β-ol with hydrogen peroxide in formic acid solution, thereby securing 3β,5α,6β-trihydroxy - 17α - methyl-17β-carbomethoxyandrostane; treating said last-named compound with N-bromo-succinimide and acetylating the crude reaction product, thereby securing 3β-acetoxy-5α-hydroxy-17α-methyl-17β-carbomethoxyandrostane-6-one; treating said last-named compound in an inert anhydrous solvent with a solution of a methyl magnesium halide, thereby securing 3β,5α,6β-trihydroxy-6α,17α-dimethylpregnan-20-one; oxidizing said last-named compound by treatment thereof with hexavalent chromium ion in molar excess, thereby securing 5α,6β-dihydroxy-6α,17α-dimethylpregnane-3,20-dione; and treating said last-named compound with concentrated hydrochloric acid in ethanol solution, thereby securing 6,17α-dimethyl-4,6-pregnadiene-3,20-dione.

3. The process of preparing 6α,17α-dimethyl-4,6-pregnadiene-3,20-dione which comprises treating 17α-methyl-17β-carbomethoxyandrost-5-ene-3β-ol with hydrogen peroxide in formic acid, thereby securing 3β,5α,6β-trihydroxy-17α - methyl-17β-carbomethoxyandrostane; treating said last-named compound with a N-halo-imide of a divalent lower aliphatic acid, and acetylating the crude oxidation product, thereby securing 3β-acetoxy-5α-hydroxy-17α-methyl-17β-carbomethoxyandrostan-6-one; converting said last-named compound to 3β,5α - dihydroxy-17α-methyl-17β-carbomethoxyandrostan-6-one and treating said last-named compound, in solution in an inert anhydrous solvent, with methyl magnesium bromide, thereby securing 3β,5α,6β - trihydroxy - 6α,17α - dimethylpregnan-20-one; treating said last-named compound with an oxidizing agent which includes hexavalent chromium ion in molar excess, thereby securing 5α,6β-dihydroxy-6α,17α-dimethylpregnane-3,20-dione; and treating said last-named compound with concentrated hydrochloric acid in ethanol solution, thereby securing 6,17α - dimethyl-4,6-pregnadiene-3,20-dione.

4. The process of preparing 6α,17α-dimethyl-4,6-pregnadiene-3,20-dione which comprises treating 17α-methyl-17β-carbomethoxyandrost-5-ene-3β-ol with hydrogen peroxide in formic acid, thereby securing 3β,5α,6β-trihydroxy-17α-methyl-17β-carbomethoxyandrostane; treating said last-named compound with N-bromo-succinimide, thereby securing 3β,5α-dihydroxy-17α-methyl-17β-carbomethoxyandrostan-6-one; treating said last-named compound, in solution in an inert anhydrous solvent, with methyl magnesium bromide, thereby securing 3β,5α,6β-trihydroxy-6α,17α-dimethylpregnan-20-one; treating said last last-named compound with an oxidizing agent including hexavalent chromium ion in molar excess, thereby securing 5α,6β - dihydroxy-6α,17α-dimethylpregnane-3,20-dione; and treating said last-named compound with concentrated hydrochloric acid in ethanol solution, thereby securing 6,17α-dimethyl-4,6-pregnadiene-3,20-dione.

5. In a process for preparing 6,17α-dimethyl-4,6-pregnadiene 3,20-dione, the step which consists in dissolving a compound selected from the group which consists of 3β,5α - dihydroxy-17α - methyl-17β-carbomethoxyandrostan-6-one and 3β - acetoxy-5α-hydroxy-17α-methyl-17β-carbomethoxyandrostan-6-one in dry tetrahydrofuran and dry benzene, and treating said solution with an ethereal solution of methyl magnesium bromide, thereby securing 3β,5α,6β-trihydroxy-6α,17α-dimethylpregnan-20-one.

6. In a process for preparing 6,17α-dimethyl-4,6-pregnadiene-3,20-dione, the step which consists in dissolving 3β,5α-dihydroxy-17α-methyl-17β-carbomethoxyandrostan-6-one in dry tetrahydrofuran and dry benzene, and treating said solution with an ethereal solution of methyl magnesium bromide, therby securing 3β,5α,6β-trihydroxy-6α,-17α-dimethylpregnan-20-one.

7. In a process for preparing 6,17α-dimethyl-4,6-pregnadiene-3,20-dione, the step which consists in dissolving 3β - acetoxy-5α-hydroxy-17α-methyl-17β-carbomethoxyandrostan-6-one in dry tetrahydrofuran and dry benzene, and treating said solution with an ethereal solution of methyl magnesium bromide, thereby securing 3β,5α,6β-trihydroxy-6α,17α-dimethylpregnan-20-one.

8. The process which comprises treating a compound selected from the group which consists of 3β,5α-dihydroxy-17α-methyl-17β-carbomethoxyandrostan-6-one and 3β - acetoxy-5α - hydroxy-17α-methyl-17β-carbomethoxyandrostan-6-one in solution in an inert anhydrous solvent with an excess of methyl magnesium bromide, thereby securing 3β,5α,6β - trihydroxy-6α,17α-dimethylpregnan-20-one.

9. The process which comprises treating 3β,5α-dihydroxy - 17α - methyl-17β-carbomethoxyandrostan-6-one in solution in an inert anhydrous solvent with an excess of methylmagnesium bromide, thereby securing 3β,5α,6β-trihydroxy-6α,17α-dimethylpregnan-20-one.

10. The process which comprises treating 3β-acetoxy-5α - hydroxy-17α-methyl-17β-carbomethoxyandrostan-6-one in solution in an inert anhydrous solvent with an excess of methyl magnesium bromide, thereby securing 3β,5α,6β-trihydroxy-6α,17α-dimethylpregnan-20-one.

11. The process which comprises bringing 17α-methyl-17β-carbomethoxyandrost-5-ene-3β-ol into contact with hydrogen peroxide in formic acid, thrby forming 3β,5α,-6β - trihydroxy-17α-methyl-17β-carbomethoxyandrostane; treating said last-named compound with an N-halo-imide of a divalent lower aliphatic acid and acylating the reaction product, thereby securing 3β-acyloxy-5α-hydroxy-17α - methyl-17β-carbomethoxyandrostane-6-one; treating said last-named compound, in solution in an anhydrous inert solvent, with a methyl magnesium halide, thereby securing 3β,5α,6β-trihydroxy-6α,17α-dimethyl-17β-carbomethoxyandrostane; treating said last-named compound, in solution in an anhydrous inert solvent, with a methyl magnesium halide, thereby securing 3β,5α,6β-trihydroxy-6α,17α-dimethylpregnan-20-one; oxidizing said last-named compound with an oxidizing agent capable of converting the 3β-hydroxy group to a 3-keto group, thereby securing 5α,6β - dihydroxy - 6α,17α-dimethylpregnane-3,20-dione; and treating said last-named compound with concentrated hydrochloric acid, thereby securing 6,17-dimethyl-4,6-pregnadiene-3,20-dione.

12. The process which comprises treating 3β,5α-dihydroxy-17α-methyl-17β - carbomethoxyandrostan-6-one, in solution in an anhydrous inert solvent, with an excess amount of a methyl magnesium halide Grignard reagent, thereby securing 3β,5α,6β - trihydroxy-6α,17α-dimethylpregnan-20-one.

13. The process which comprises treating a 3β-acyloxy-5α - hydroxy-17α - methyl-17β-carbomethoxyandrostan-6- one, in solution in an anhydrous inert solvent, with an excess amount of a methyl magnesium halide Grignard reagent, thereby securing 3β,5α,6β-trihydroxy-6α,17α-dimethylpregnan-20-one.

References Cited by the Examiner

UNITED STATES PATENTS 3,062,844 11/62 Ellis et al. _____ 260—397.4
3,085,090 4/63 Graber et al. _____ 260—397.4
3,133,913 5/64 Deghenghi _____ 260—239.55

OTHER REFERENCES

Fieser et al.: "Amer. Chem. Soc. J.," vol. 71, 1949, pp. 3938–3941.

LEWIS GOTTS, *Primary Examiner.*

UNITED STATES PATENT OFFICE
CERTIFICATE OF CORRECTION

Patent No. 3,170,936            February 23, 1965

Peter F. Morand et al.

It is hereby certified that error appears in the above numbered patent requiring correction and that the said Letters Patent should read as corrected below.

Column 4, line 25, for "(2M, 375 ml.)" read -- (3M, 375 mL) --; column 6, line 66, for "6,17-dimethyl-4,6-" read -- 6,17α-dimethyl-4,6- --.

Signed and sealed this 17th day of August 1965.

(SEAL)
Attest:

ERNEST W. SWIDER
Attesting Officer

EDWARD J. BRENNER
Commissioner of Patents